US008532863B2

(12) United States Patent
Hadsell et al.

(10) Patent No.: US 8,532,863 B2
(45) Date of Patent: Sep. 10, 2013

(54) AUDIO BASED ROBOT CONTROL AND NAVIGATION (75) Inventors: Raia Hadsell, Princeton Junction, NJ (US); Supun Samarasekera, Princeton, NJ (US); Ajay Divakaran, Monmouth Junction, NJ (US)

(73) Assignee: SRI International, Menlo Park, CA (US)

( * ) Notice: Subject to any disclaimer, the term of this patent is extended or adjusted under 35 U.S.C. 154(b) by 351 days.

(21) Appl. No.: 12/892,048

(22) Filed: Sep. 28, 2010

(65) Prior Publication Data

US 2011/0077813 A1 Mar. 31, 2011

Related U.S. Application Data (60) Provisional application No. 61/246,211, filed on Sep. 28, 2009.

(51) Int. Cl.
*G05D 1/00* (2006.01)

(52) U.S. Cl.
USPC ........ 701/26; 701/2; 701/23; 701/25; 701/28; 701/448; 700/245; 700/246; 700/253; 700/258; 700/259

(58) Field of Classification Search
None
See application file for complete search history.

(56) References Cited

U.S. PATENT DOCUMENTS

| | | | | |
|---|---|---|---|---|
| 5,200,931 A * | 4/1993 | Kosalos et al. | | 367/88 |
| 6,629,033 B2 * | 9/2003 | Preston et al. | | 701/70 |
| 6,819,863 B2 * | 11/2004 | Dagtas et al. | | 386/249 |
| 7,162,338 B2 * | 1/2007 | Goncalves et al. | | 701/23 |
| 7,536,029 B2 * | 5/2009 | Choi et al. | | 382/103 |
| 7,548,697 B2 * | 6/2009 | Hudson et al. | | 398/106 |
| 7,558,809 B2 * | 7/2009 | Radhakrishnan et al. | | 1/1 |
| 8,019,491 B1 * | 9/2011 | McCusker | | 701/4 |
| 8,190,295 B1 * | 5/2012 | Garretson et al. | | 700/245 |
| 8,352,075 B2 * | 1/2013 | Cho et al. | | 700/259 |
| 2003/0103647 A1 * | 6/2003 | Rui et al. | | 382/103 |
| 2004/0039498 A1 * | 2/2004 | Ollis et al. | | 701/23 |
| 2004/0252845 A1 * | 12/2004 | Tashev | | 381/56 |
| 2005/0024492 A1 * | 2/2005 | Schaefer et al. | | 348/135 |
| 2005/0125223 A1 * | 6/2005 | Divakaran et al. | | 704/223 |
| 2006/0025888 A1 * | 2/2006 | Gutmann et al. | | 700/245 |
| 2006/0075422 A1 * | 4/2006 | Choi et al. | | 725/18 |
| 2006/0089764 A1 * | 4/2006 | Filippov et al. | | 701/23 |
| 2007/0070069 A1 * | 3/2007 | Samarasekera et al. | | 345/427 |
| 2007/0201558 A1 * | 8/2007 | Xu et al. | | 375/240.22 |
| 2008/0027590 A1 * | 1/2008 | Phillips et al. | | 701/2 |
| 2008/0086241 A1 * | 4/2008 | Phillips et al. | | 701/2 |
| 2011/0282169 A1 * | 11/2011 | Grudic et al. | | 600/324 |

* cited by examiner

*Primary Examiner* — Khoi Tran
*Assistant Examiner* — Jonathan L Sample
(74) *Attorney, Agent, or Firm* — Moser Taboada (57) ABSTRACT A computer implemented method for unattended detection of a current terrain to be traversed by a mobile device is disclosed. Visual input of the current terrain is received for a plurality of positions. Audio input corresponding to the current terrain is received for the plurality of positions. The video input is fused with the audio input using a classifier. The type of the current terrain is classified with the classifier. The classifier may also be employed to predict the type of terrain proximal to the current terrain. The classifier is constructed using an expectation-maximization (EM) method.

25 Claims, 5 Drawing Sheets

AUDIO BASED ROBOT CONTROL AND NAVIGATION

CROSS-REFERENCE TO RELATED APPLICATIONS

This application claims the benefit of U.S. provisional patent application No. 61/246,211 filed Sep. 28, 2009, the disclosure of which is incorporated herein by reference in its entirety.

FIELD OF THE INVENTION

The present invention relates generally to control systems, and more particularly, to a method and a digital processing system for real-time or near-real-time automatic robot control and robot navigation via feedback from audio and video classification based real-time terrain mapping.

BACKGROUND OF THE INVENTION

Robotic control has found many applications over the past few decades. No longer are robots limited to the laboratory or fixed in place for manufacturing products in factories. Robots and robotic control now include terrain assessment and terrain mapping for use in military, space exploration, and automotive applications. A mobile robot may be sent into unknown off-road terrain, such as jungles, deserts, and hills, where generally smooth, flat terrain is rare. It would be desirable for such a robot to quickly adapt to the new terrain and to explore and map the terrain without human tuning or training.

In automotive applications, unmanned autonomous vehicles may be configured to follow paths or roads, especially when lane markings are absent, to patrol small roads or navigate paths with an internal map. If a vehicle encounters a particular type of terrain, it may be able to predict the nature of the terrain several yards in advance. Thus, an autonomous vehicle design may be configured to steer itself.

Yet a third application is slip detection. Manned and unmanned vehicles need to recognize and avoid poor driving surfaces such as loose sand or soft mud. The appearance of such surfaces may change dramatically and, as a result, fool a human driver or a simple visual recognition system into making unforeseen and potentially dangerous mistakes.

All such robot and autonomous vehicle control and navigation applications are dependent on both short and long range accurate terrain recognition. The design of such systems should meet certain goals: the navigation system should be robust to irrelevant variations and occlusions, be adaptive to new environments, and adapt in real time or near real time.

Unfortunately, prior art terrain detection and navigation systems have been poor in assessing the kind of large environmental variations found in extreme environments, such as deserts, marshes, and jungles. Prior art navigation systems have been poor in adapting in real time to dynamic changes in appearance, such as lighting conditions, occlusions, and shape variability. Further, long range 2D or 3D sensors have been poor at assessing surface qualities such as hardness, slip, and/or traction. At best, prior art terrain detection systems have employed classification of objects or terrain into a limited list of categories. As a result, such system cannot adapt to objects not found in the list.

Accordingly, what would be desirable, but has not yet been provided, is a system and method for real-time or near-real-time automatic, unattended detection of short and long distance terrain for accurate control and navigation of mobile robots and autonomous vehicles.

SUMMARY OF THE INVENTION

The above-described problems are addressed and a technical solution is achieved in the art by providing a computer implemented method for unattended detection unattended detection of a current terrain to be traversed by a mobile device, comprising the steps of: receiving visual input of the current terrain for a plurality of positions; receiving audio input corresponding to the current terrain for the plurality of positions; fusing the video input with the audio input using a classifier; and classifying the type of the current terrain with the classifier. According to an embodiment of the present invention, the classifier is constructed using an expectation-maximization (EM) method. The EM method employed comprises: constructing a parameterized video processing function based on the visual input received over the plurality of positions; constructing a parameterized audio processing function based on the audio input received over the plurality of positions; holding the video processing function fixed and optimizing the parameterized audio processing function using the EM method to produce an optimized audio classification of the terrain; holding the audio processing function fixed and optimizing the parameterized video processing function using the EM method to produce an optimized video classification of the terrain; and associating the audio classification with the video classification to produce an optimized fused classification of the current terrain. The parameters of the audio or video processing function may be obtained using a regression.

According to an embodiment of the present invention, the classifier is employed to predict the type of terrain proximal to the current terrain. The course of the mobile device may be changed based on the prediction. The classifier may be a fixed representation or adaptively trained classifier. The classifier may be based on a Gaussian mixture model or a hidden Markov model.

According to an embodiment of the present invention, the visual input may be represented by scale-invariant feature transformation (SIFT) features or by a scale-invariant pyramid. The audio input may be represented by one of a Gaussian mixture model (GMM), a hidden Markov model, and a time-delay neural network (TDNN).

According to an embodiment of the present invention, a system for unattended detection of unattended detection of a current terrain to be traversed by a mobile device, comprising: at least one image capturing device for receiving visual input of the current terrain for a plurality of positions; at least one audio capturing device for receiving audio input corresponding to the current terrain for the plurality of positions; at least one processor communicatively connected to the at least one image capturing device and the at least one audio capturing device for: fusing the video input with the audio input using a classifier; and classifying the type of the current terrain with the classifier. According to an embodiment of the present invention, the classifier is constructed using an expectation-maximization (EM) method.

According to an embodiment of the present invention, the at least one audio capturing device may be communicatively connected to at least one wheel of the mobile device. The audio capturing device may be one of an audio microphone and a contact microphone.

BRIEF DESCRIPTION OF THE DRAWINGS

The present invention will be more readily understood from the detailed description of exemplary embodiments presented below considered in conjunction with the attached drawings in which like reference numerals refer to similar elements and in which.

It is to be understood that the attached drawings are for purposes of illustrating the concepts of the invention and may not be to scale.

DETAILED DESCRIPTION OF THE INVENTION

Embodiments of the present invention employ an exemplary system and method for real-time or near-real-time automatic, unattended detection of short and long distance terrain for accurate control and navigation of mobile robots and autonomous vehicles.

The term "computer" or "computer platform" is intended to include any data processing device, such as a desktop computer, a laptop computer, a mainframe computer, a server, a handheld device, a digital signal processor (DSP), an embedded processor (an example of which is described in connection with FIG. 1 hereinbelow), or any other device able to process data. The term "communicatively connected" is intended to include any type of connection, whether wired or wireless, in which data may be communicated. The term "communicatively connected" is intended to include, but not limited to, a connection between devices and/or programs within a single computer or between devices and/or separate computers over a network. The term "network" is intended to include, but not limited to, OTA (over-the-air transmission, ATSC, DVB-T), video over packet-switched networks (TCP/IP, e.g., the Internet), satellite (microwave, MPEG transport stream or IP), direct broadcast satellite, analog cable transmission systems (RF), digital video transmission systems (ATSC, HD-SDI, HDMI, DVI, VGA), etc.

Figure 1:
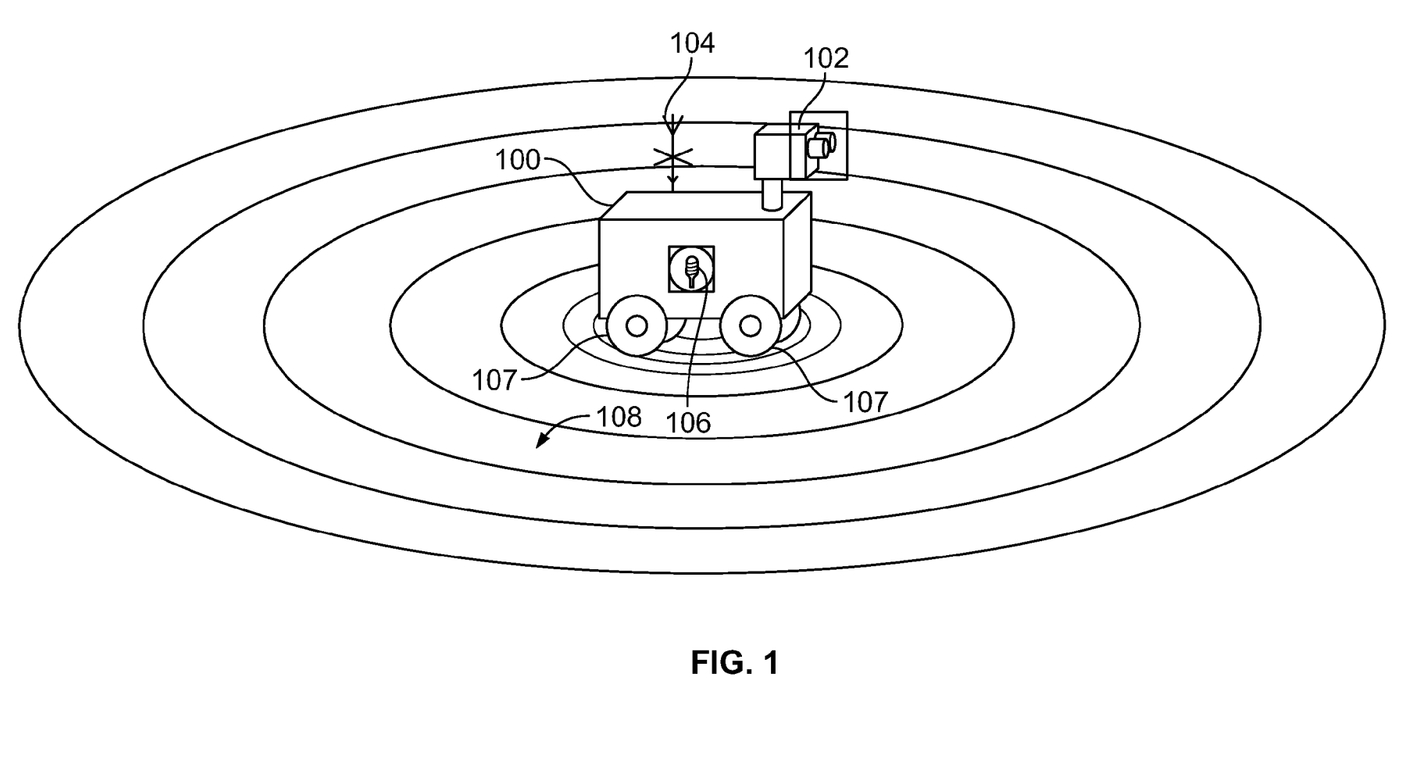
FIG. 1 depicts an exemplary robot or autonomous vehicle having a navigation system that automatically detects short and long distance terrain, according to an embodiment of the present invention.

FIG. 1 depicts an exemplary robot or autonomous vehicle 100, having a navigation system that automatically detects short and long distance terrain, according to an embodiment of the present invention. The robot or vehicle 100 may include one or more suitable monocular and/or stereo image capturing devices 102 for capturing mid and long range visual information (e.g., one or more still or video cameras, shape cameras, LIDAR or IR photogrammetry-generated range data). Optionally, the digitized video or still images may be received from a network 104, such as the Internet. Suitable image capturing devices may comprise, for example, cameras with embedded transmission functions, camera transceiver systems, a video encoding appliance, a video statistical multiplexing appliance (statmux), computers with video capture cards, computers with attached cameras media servers that are spooling/streaming video files, PCs that are spooling/streaming video files, PCs, tablets, mobile phones, PDAs, video decoding appliances, video demultiplexing appliances, televisions, and television distribution devices (e.g., AppleTV™).

According to an embodiment of the present invention, the robot 100 includes one or more audio capturing devices 106, e.g., acoustic or contact microphones located proximal to the one or more wheels 107 for capturing short range audio signals as the vehicle's wheels roll over a surface 108.

Figure 2:
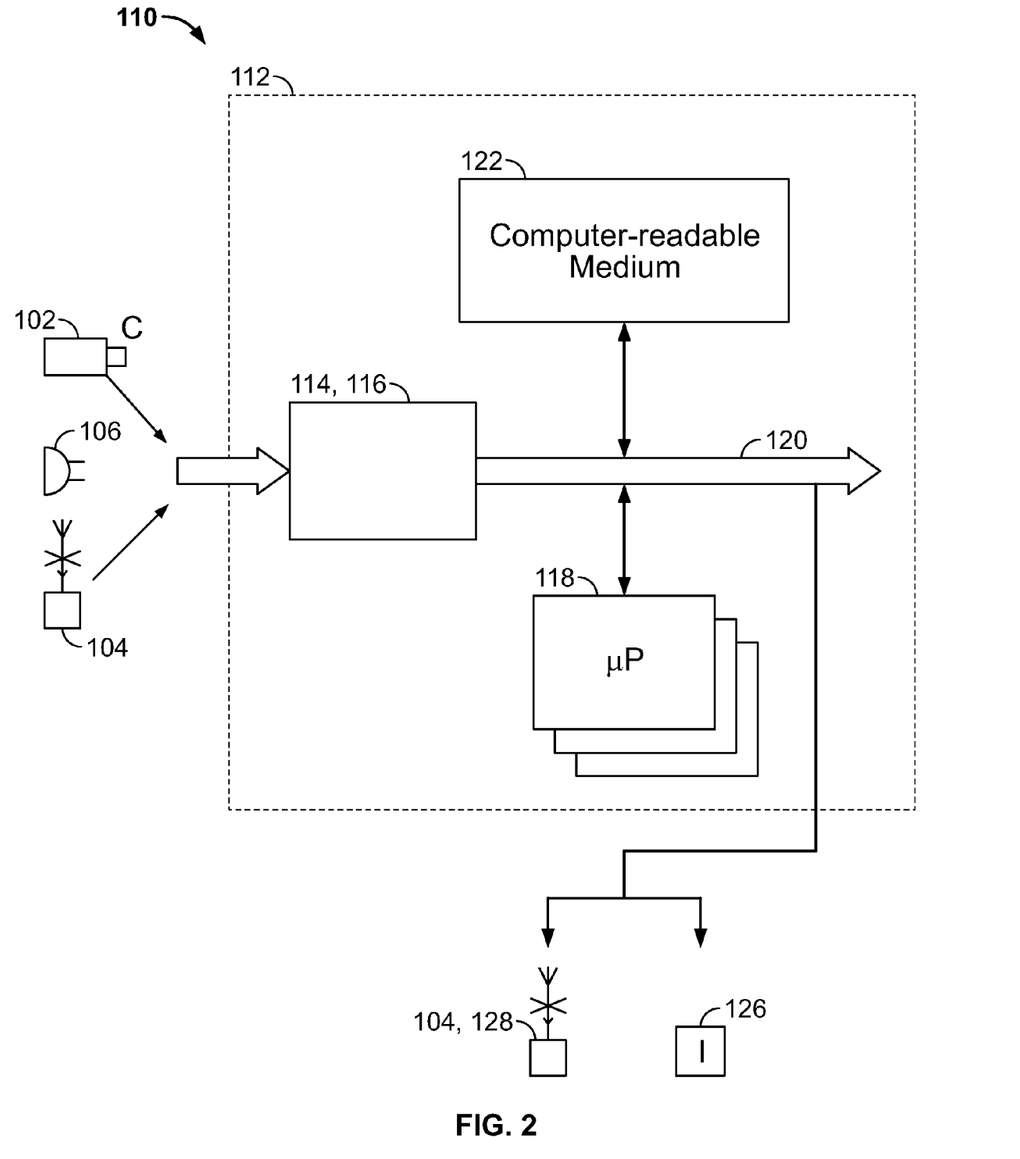
FIG. 2 is a hardware block diagram of an exemplary digital processing system for detecting short and long distance terrain, according to an embodiment of the present invention.

FIG. 2 is a hardware block diagram of an exemplary digital processing system 110 for detecting short and long distance terrain, according to an embodiment of the present invention. There may be one such system 110 for terrain detection for the vehicle 100, or their may be a plurality of such systems 110, each controlling a single wheel or degree of freedom of the vehicle 100. Each such system 110 includes a computing platform 112, and may optionally include a digital video capture system 114 and a digital audio capturing system 116. The digital video capturing system 114 processes streams of digital video, or converts analog video to digital video, to a form which can be processed by the computing platform 112. Likewise, the digital audio capturing system 116 processes streams of digital audio, or converts analog audio to digital audio from one or more of the acoustic or contact microphones 106, to a form which can be processed by the computing platform 112. Optionally, the digitized video or still images may be received from a network 104, such as the Internet. The digital video capturing system 114 and/or the digital audio capturing system 116 may be stand-alone hardware, or cards such as Firewire cards which can plug-in directly to the computing platform 112. According to an embodiment of the present invention, the image capturing devices 102 and/or the acoustic or contact microphones 106 may interface with the computing platform 112 over a digital data link (e.g., Ethernet). The computing platform 112 may include one or more embedded controllers, a personal computer, or a work-station (e.g., a Pentium-M 1.8 GHz PC-104 or higher) comprising one or more processors 118 which includes a bus system 119 which is fed by a video/audio data streams 120 via the one or more processors 118 or directly to a computer-readable medium 122. Alternatively, the computing platform 112 may be implemented as or part of an integrated circuit, such as a graphics processing unit (GPU) or digital signal processor (DSP) implemented in an FPGA or ASIC.

The computer readable medium 122 may also be used for storing the instructions of the system 110 to be executed by the one or more processors 118, including an optional operating system, such as the Windows or the Linux operating system. The computer readable medium 122 may further be used for the storing and retrieval of processed video and/or of the present invention in one or more databases. The computer readable medium 122 may include a combination of volatile memory, such as RAM memory, and non-volatile memory, such as flash memory, optical disk(s), and/or hard disk(s). Portions of a processed video/audio data stream 124 may be stored temporarily in the computer readable medium 122 for later output to one or more navigation control units 126 for steering the vehicle 100. Optionally, portions of the processed video/audio data stream 122 may be stored temporarily in the computer readable medium 122 for later output to the network 104, such as the Internet, or to a satellite system via a transmitter 128.

Figure 3:
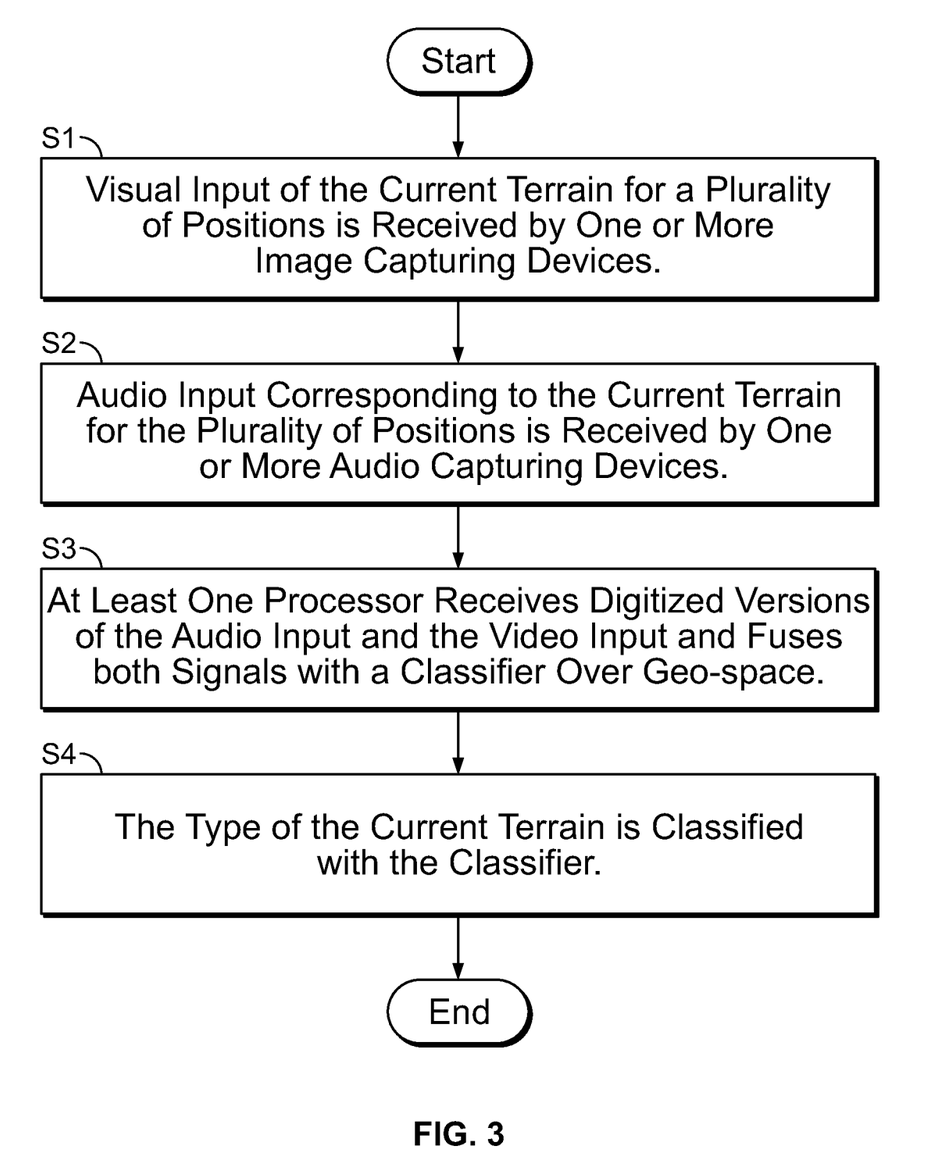
FIG. 3 is a process flow diagram illustrating exemplary steps for unattended detection of short and long distance terrain for control and navigation or a mobile device, according to an embodiment of the present invention.

FIG. 3 is a process flow diagram illustrating exemplary steps for unattended detection of short and long distance terrain for control and navigation of a mobile device, according to an embodiment of the present invention. Referring now to FIGS. 1-3, in step S1, visual input of the current terrain for a plurality of positions is received by the one or more image capturing devices 102. The image capturing devices 102 provide mid and long range visual information concerning the geometry of the terrain in the field of view. The current geo-location of the one or more image capturing devices 102 may also be provided. As used herein, the term "geo-location" refers to the identification of a real-world geographic location of an object, such as a cell phone or an Internet-connected computing device. Geo-location may refer to the practice of assessing the location, or to the actual assessed location.

Localization (i.e., local position) may be further enhanced by means of the application of a visual odometry method to determine the pose of the image capturing devices 102.

According to an embodiment of the present invention, the video input is converted to a digital video signal as described above in connection with FIG. 2. The at least one processor 118 may transform the digitized video signal and corresponding geo-location(s) to one of scale-invariant feature transformation (SIFT) features representation or a geometry-based feature representation, such as a scale-invariant pyramid. A person skilled in the art would appreciate that SIFT features are sparse but scale invariant. A person skilled in the art would also appreciate that a scale-invariant pyramid provides a dense and accurate representation of objects in the field of view since accurate pose information of the image capturing devices 102 is provided. Such data models have proven roust to irrelevant visual transformations due to lighting, viewpoint (i.e., pose), scale, and shape deformations.

In step S2, audio input corresponding to the current terrain for the plurality of positions is received by the one or more audio capturing devices 106. The audio capturing devices 106 may be communicatively connected to the wheels of the vehicle 100. As the vehicle's wheels roll over the ground surface, the audio capturing devices 106 produce a local electrical audio signal that is representative of the vibrations produced by the wheels of the vehicle 100. These representative vibrations produce audio signatures corresponding to the texture of the local terrain. This audio signal(s) is a local, highly sensitive sensing modality. It may be used to detect ground surface type and quality.

For example, the received acoustic signatures may indicate a rough surface, such as from pebbles, sand, off-road rocky terrain, or a potholed pavement of asphalt or concrete; a medium textured surface, such as grass; or a smooth surface, such as a non-potholed pavement. The audio capturing devices 106 may also provide an indication of change in ground texture (e.g., moving from a roadway to grass). The audio capturing devices 106 may also provide an association with vehicle behavior (e.g., a slip or an encounter with an obstruction). Such ground texture signatures provide richer information than visual or geometric sensors alone, as provided in the prior art.

According to an embodiment of the present invention, the audio input is converted to a digital audio signal as described above in connection with FIG. 2. The at least one processor 118 may transform the digitized audio signal and corresponding geo-location(s) to one of a Gaussian mixture model (GMM), a hidden Markov model, and a time-delay neural network (TDNN). Such models have proven resistant (i.e., having a filtering out effect) to extraneous audio input, such as from irrelevant external noises (e.g., animal noises, human speech, traffic, etc.) or from irrelevant local noises (e.g., the vehicle's engine or steering mechanism(s)).

In step S3, the at least one processor 118 receives digitized versions of the audio input and the video input and fuses both signals to a common representation over geo-space (e.g., a plurality of x-y positions). The common representation may be classifier.

Fusing video input from the video capturing devices 102 with audio input from the audio capturing devices 106 using a classifier improves overall sensor range. As a result, an accurate representation of the current, proximal, and long range terrain is provided. This increase in accuracy is achieved between the video capturing devices 102 and the audio capturing devices 106 through transfer learning and cross validation. Transfer learning is an association created between visual input signatures and audio input signatures, wherein when one classification is "seen" by the video capturing devices 102, then a certain terrain texture should be expected to be captured by the audio capturing devices 106 and vice versa. For example, if the video input depicts grass, then the system 110 expects to receive the texture of grass from the audio input. Cross validation implies that receiving a texture of grass from the audio input confirms a visual input that indicates grass.

According to an embodiment of the present invention, the classifier has the following characteristics. The classifier may be a fixed classification scheme or dynamic (i.e., learned). The latter implies that for certain applications, the classifier may need to be adaptive (i.e., adapt to changing terrain in real time or near real time). A suitable representation for modeling the digitized video and/or audio signatures is a Gaussian mixture model or a hidden Markov model.

Figure 4A:
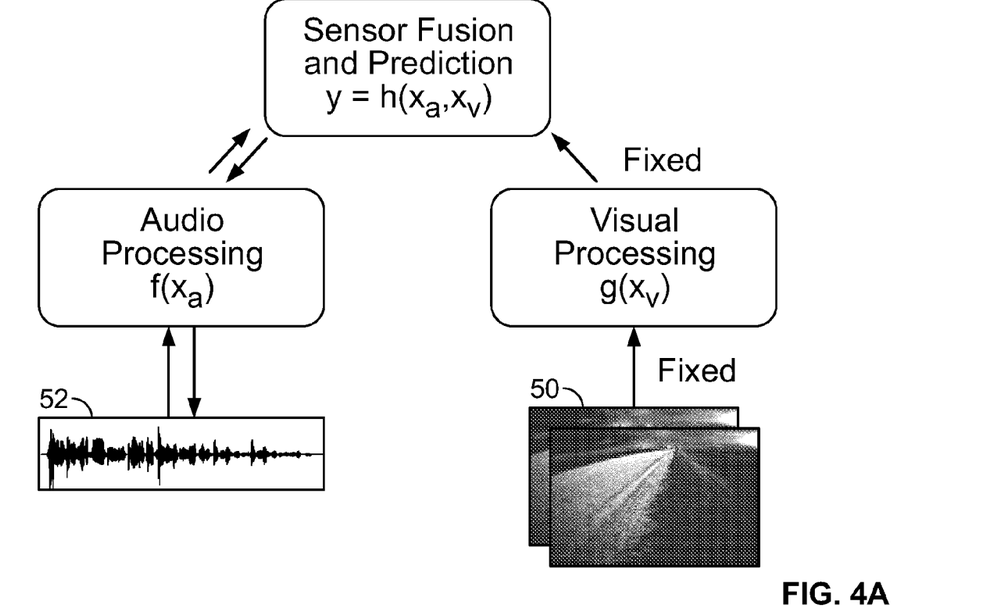
FIGS. 4A and 4B depict the construction of a classifier for fusing visual and audio input using an EM method visually, according to an embodiment of the present invention.
Figure 4B:
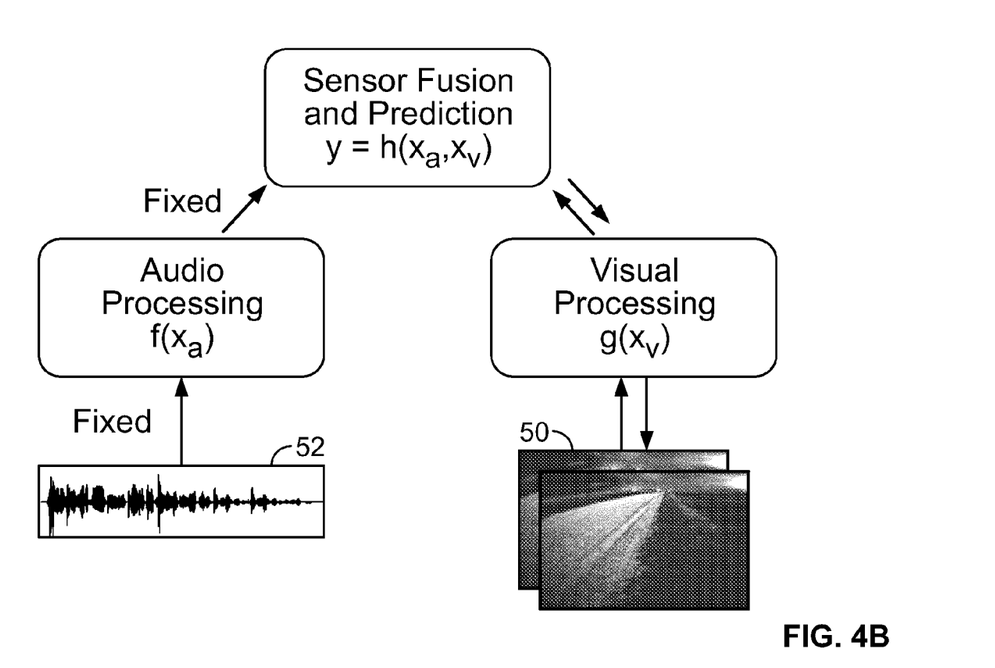
Figure 5:
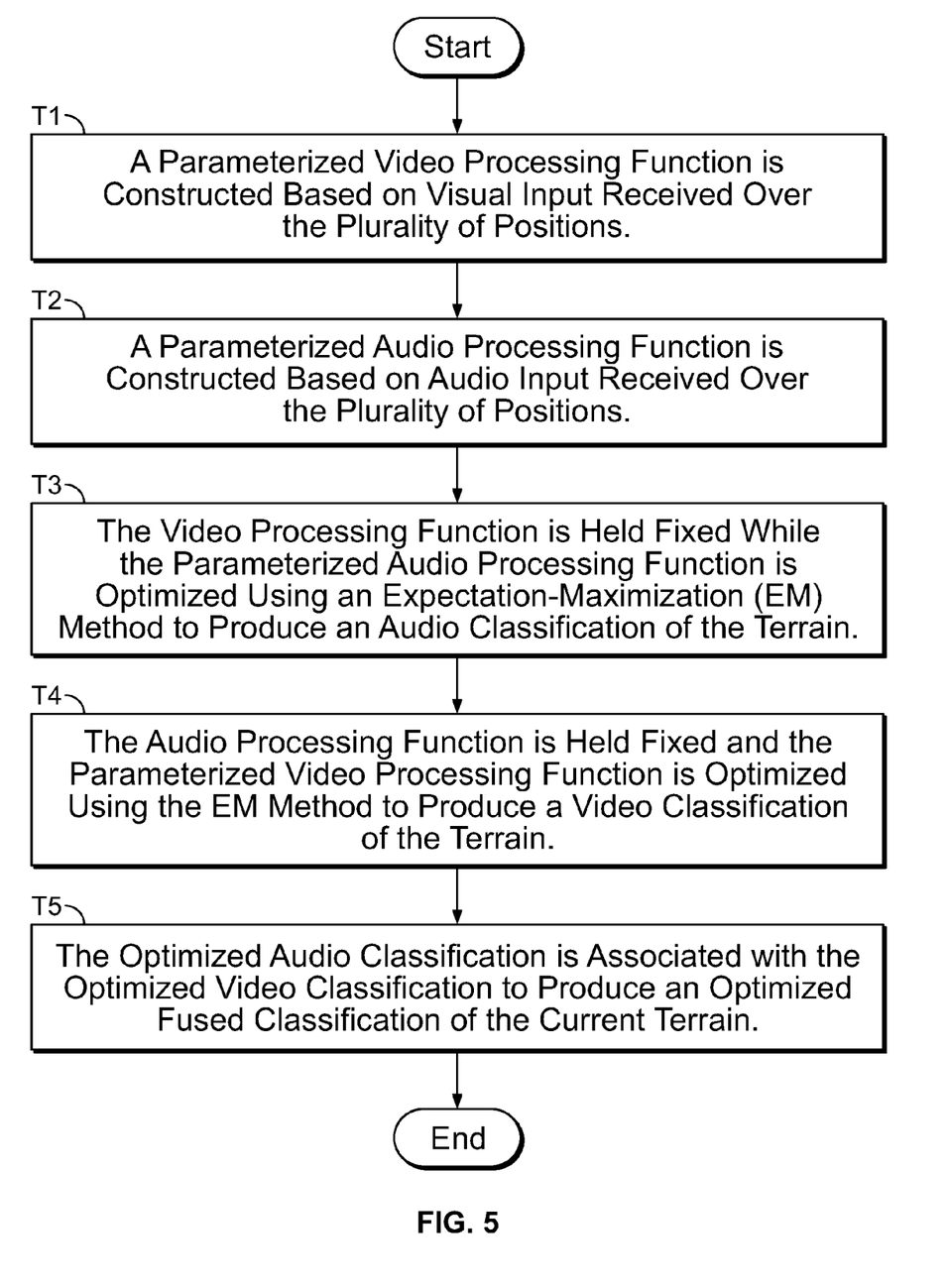
FIG. 5 is a process flow diagram illustrating exemplary steps for constructing classifier for fusing visual and audio input using an EM method, according to an embodiment of the present invention.

A suitable fused classifier of visual and audio sensor data may be constructed using an expectation maximization (EM) algorithm. FIGS. 4A and 4B depict the construction of the classifier visually, while FIG. 5 is a process flow diagram illustrating exemplary steps for constructing a classifier for fusing visual and audio input using an EM method, according to an embodiment of the present invention. Referring now to FIGS. 4A, 4B and 5, in step T1, a parameterized video processing function, $g(x_v)$ is constructed based on visual input 50 received over the plurality of positions $(x_v)$. In step T2, a parameterized audio processing function, $f(x_a)$ is constructed based on audio input 52 received over the plurality of positions $(x_n)$. In step T3, the video processing function, $g(x_v)$ is held fixed while the parameterized audio processing function $f(x_a)$ is optimized using the EM method to produce an audio classification of the terrain. In step T4, the audio processing function $f(x_a)$ is held fixed and the parameterized video processing function $g(x_v)$ is optimized using the EM method to produce a video classification of the terrain. In step T5, the optimized audio classification is associated with the optimized video classification to produce an optimized fused classification of the current terrain $y=h(x_a, x_v)$. According to an embodiment of the present invention, the order of fixing and optimizing processing functions described hereinabove may be reversed.

The parameters of the parameterized audio processing function, $f(x_a)$ and/or the video processing function, $g(x_v)$ may be obtained by means of a regression. As used herein, a regression refers to a technique of fitting a simple equation to real data points, such as a linear regression (i.e., fitting a set of points to a line).

A suitable, but not exclusive, EM method for optimizing the audio/video classification function is as follows. One processing function is held fixed while the other is varied. A centroid for the varied function is calculated for the set of positions in the terrain (i.e., the expectation) and compared to a summation of calculated distances between the centroid and actual measured values of position for the processing function (e.g., a Euclidian distance between the centroid and measured distance values is calculated and summed). Typically the centroid and the summed distance values produce a large and incorrect measure. As a result, a new centroid is chosen for the expectation and calculations/summation of distances is repeated iteratively. Eventually, the parameterized function converges on an optimized centroid that produces a minimal summation (i.e., the maximization).

Returning now to FIG. 3, in step S4, the type of the current terrain is classified with the classifier. According to an embodiment of the present invention, once the terrain is classified, the classifier may be employed to predict the type of terrain proximal to the current terrain. For example, the classification may indicate grassy terrain in the immediate vicinity of the vehicle 100 based on audio input but the visual input may indicate a roadway in the near distance. Since the prediction is a change from grassy terrain to smooth terrain of a road, the vehicle 100 may be instructed by the processor(s) 118 to change course to remain on the grassy terrain.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A method for unattended detection of a current terrain to be traversed by a mobile device, comprising the steps of:
receiving, from a visual sensor, visual input of the current terrain for a plurality of positions;
receiving audio input corresponding to the current terrain for the plurality of positions;
fusing the video input with the audio input using a classifier; and
classifying the type of the terrain with the classifier.

2. The method of claim 1, wherein the classifier is constructed using an expectation maximization (EM) method.

3. The method of claim 2, wherein the expectation-maximization (EM) method comprises the steps of:
constructing a parameterized video processing function based on the visual input received over the plurality of positions;
constructing a parameterized audio processing function based on the audio input received over the plurality of positions;
holding the video processing function fixed and optimizing the parameterized audio processing function using the EM method to produce an optimized audio classification of the terrain;
holding the audio processing function fixed and optimizing the parameterized video processing function using the EM method to produce an optimized video classification of the terrain; and
associating the optimized audio classification with the optimized video classification to produce ,an optimized fused classification of the current terrain.

4. The method of claim 3, wherein parameters of at least one of the video and audio processing function are obtained using a regression.

5. The method of claim 1, wherein the classifier is employed to predict the type of terrain proximal to the current terrain.

6. The method of claim 5, further comprising the step of the mobile device changing course based on the prediction.

7. The method of claim 1, wherein the classifier is one of a fixed classifier and adaptively trained classifier.

8. The method of claim 1, wherein the classifier is based on one of a Gaussian mixture model and a hidden Markov model.

9. The method of claim 1, wherein the visual input is represented by scale-invariant feature transformation (SIFT) features.

10. The method of claim 1, wherein the video input is represented by a scale-invariant pyramid.

11. The method of claim 1, wherein the audio input is represented by one of a Gaussian mixture model (GMM), a hidden Markov model, and a time-delay neural network (TDNN).

12. A system for unattended detection unattended detection of a current terrain to be traversed by a mobile device, comprising:
at least one image capturing device for receiving visual input of the current terrain for a plurality of positions;
at least one audio capturing device for receiving audio input corresponding to the current terrain for the plurality of positions;
at least one processor communicatively connected to the at least one image capturing device and the at least one audio capturing device for:
fusing the video input with the audio input using a classifier; and
classifying the type of the current terrain with the classifier.

13. The system of claim 12, wherein the classifier is constructed using an expectation-maximization (EM) method.

14. The system of claim 13, wherein the expectation-maximization (EM) method comprises the steps of:
constructing a parameterized video processing function based on the visual input received over the plurality of positions;
constructing a parameterized audio processing function based on the audio input received over the plurality of positions;
holding the video processing function fixed and optimizing the parameterized audio processing function using the EM method to produce an optimized audio classification of the terrain;
holding the audio processing function fixed and optimizing the parameterized video processing function using the EM method to produce an optimized video classification of the terrain; and
associating the optimized audio classification with the optimized video classification to produce an optimized fused classification of the current terrain.

15. The system of claim 14, wherein parameters of at least one of the video and audio processing function are obtained using a regression.

16. The system of claim 12, wherein the classifier is employed to predict the type of terrain proximal to the current terrain.

17. The system of claim 16, further comprising the step of the mobile device changing course based on the prediction.

18. The system of claim 12, wherein the at least one audio capturing device is communicatively connected to at least one wheel of the mobile device.

19. The system of claim 12, wherein the audio capturing device is one of an audio microphone and a: contact microphone.

20. A non-transitory computer-readable medium comprising computer-executable instructions for unattended detection of a current terrain to be traversed by a mobile device, the instructions configured to:
receive visual input, from a visual sensor, of the current terrain for a plurality of positions;

receive audio input corresponding to the current terrain for the plurality of positions;

fuse the video input with the audio input using a classifier; and classify the type of the current terrain with the classifier.

21. The computer-readable medium of claim 20, wherein the classifier is constructed using an expectation-maximization (EM) method.

22. The computer-readable medium of claim 21, wherein the expectation maximization (EM) method comprises the steps of:

constructing a parameterized video processing function based on the visual input received over the plurality of positions;

constructing a parameterized audio processing function based on the audio input received over the plurality of positions;

holding the video processing function fixed and optimizing the parameterized audio processing function using the EM method to produce an optimized audio classification of the terrain;

holding the audio processing function fixed and optimizing the parameterized video processing function using the EM method to produce an optimized video classification of the terrain; and associating the optimized audio classification with the optimized video classification to produce an optimized fused classification of the current terrain.

23. The computer-readable medium of claim 22, wherein parameters of at least one of the video and audio processing function are obtained using a regression.

24. The computer-readable medium of claim 22, wherein the classifier is employed to predict the type of terrain proximal to the current terrain.

25. The computer-readable medium of claim 22, wherein the instructions are further configured cause the mobile device to change course based on the prediction.

\* \* \* \* \*